(No Model.)
F. A. BROWNELL.
ROLL HOLDING CAMERA.
No. 579,949. Patented Apr. 6, 1897.
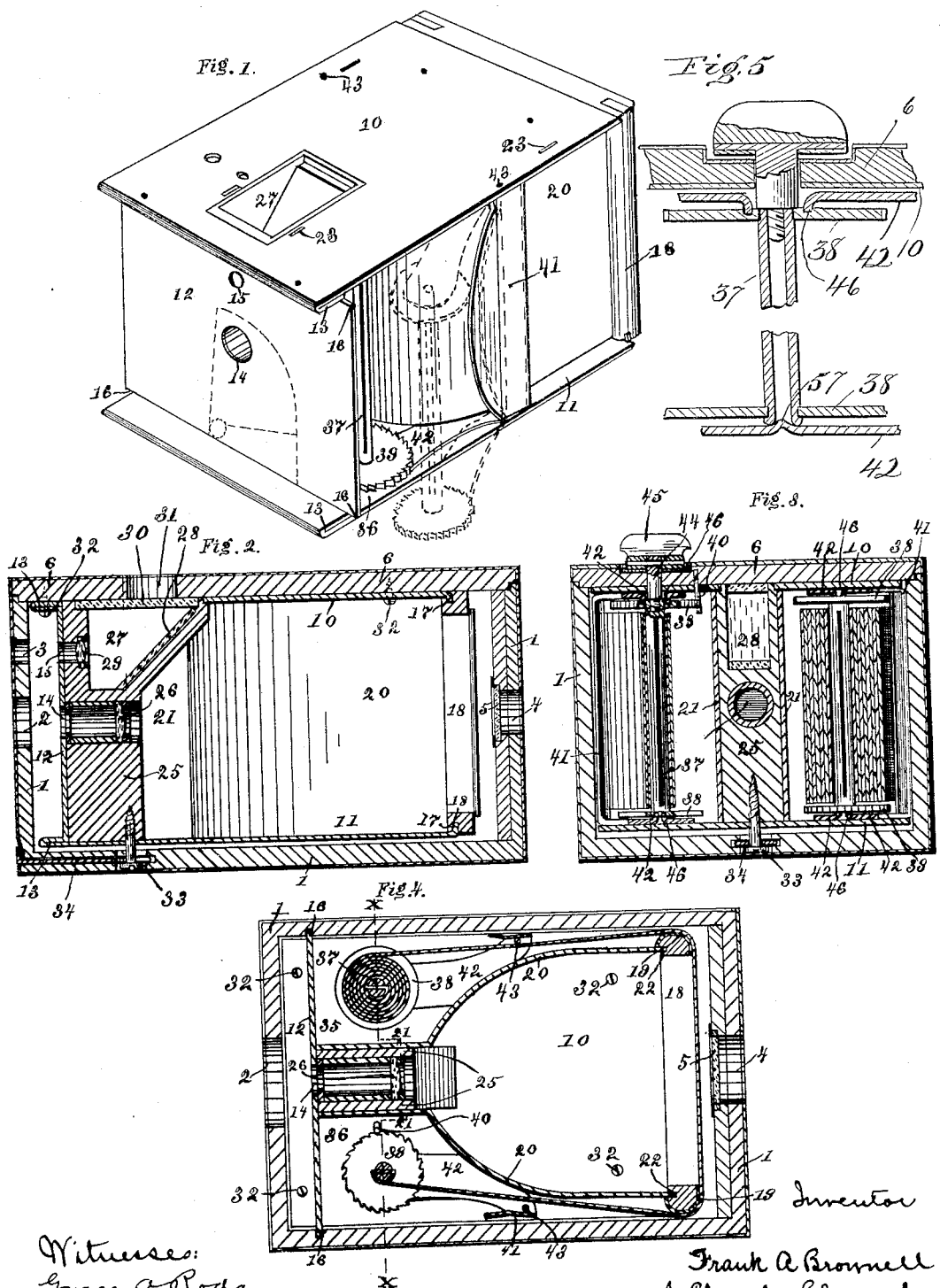
Witnesses:
Grace A. Roda.
Thomas Durant.
Inventor
Frank A. Brownell
by Church & Church
his attys.

UNITED STATES PATENT OFFICE.

FRANK A. BROWNELL, OF ROCHESTER, NEW YORK, ASSIGNOR TO THE EASTMAN KODAK COMPANY, OF SAME PLACE.

ROLL-HOLDING CAMERA.

SPECIFICATION forming part of Letters Patent No. 579,949, dated April 6, 1897.

Application filed May 11, 1895. Serial No. 548,983. (No model.)

*To all whom it may concern:*

Be it known that I, FRANK A. BROWNELL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photographic cameras, and has for its object to provide a simple, cheap, and compact camera particularly adapted for use in connection with rolls or spools of flexible photographic film, and in which the parts are so arranged and constructed that ready access may be had to the interior for reloading and removing spools of exposed film; and said invention consists in certain improvements and combinations of parts, all as will be hereinafter fully described and the novel features pointed out in the claims at the end of this specification.

In the drawings, Figure 1 is a perspective view of a portion of the frame adapted to carry the operating parts of my improved camera removed from the casing; Fig. 2, a longitudinal sectional view of the complete camera; Fig. 3, a cross-sectional view of the same on the line *x x* of Fig. 4, looking toward the rear; Fig. 4, a horizontal sectional view, looking toward the top. Fig. 5 is an enlarged sectional view showing the spool-holding devices.

Similar reference-numerals in the several figures indicate similar parts.

The outer casing 1 of the camera is composed of any suitable material, provided at the front with apertures 2 and 3 for the main lens and the finder-lens, respectively, and at the rear is provided an opening 4, preferably covered by red or other non-actinic glass or gelatin 5. This casing is preferably open at one side, which is adapted to be closed by a cover-board 6, to which the frame and operating parts of the camera are secured, said cover-board being formed to coöperate with the sides and ends of the main casing and form a light-tight joint, as will be understood.

The frame carrying the operating parts of the camera, which is shown removed in Fig. 1, is constructed, preferably, of three pieces of metal, preferably aluminium, the main or body portion consisting of a single sheet bent to form the top 10, the bottom 11, and the front 12, the beads or double flanges 13 being formed at the top or bottom of the front and serving to stiffen the frame and also as a protecting means for the shutter mechanism, which is mounted upon the front plate 12, as indicated in dotted lines, this plate 12 having a lens-aperture 14 and the aperture 15 for the finder-lens. The sides of the front 12 are preferably extended out beyond the top and bottom portions, forming flanges 16, adapted to coöperate with the grooves formed in the sides of the main casing, as shown particularly in Fig. 4, and the rear portions of the top and bottom plates are bent inward, forming flanges 17, which coöperate with suitable grooves formed in the rear wooden frame 18, over which the film is to be stretched, the sides of said frame 18 being preferably covered with velvet or similar material 19, as shown particularly in Fig. 4. The flanges 16 serve to position the frame in the casing and if the doubled flanges 13 were dispensed with would protect the shutter mechanism from accident.

20 indicates two metal plates, similarly formed, with the substantially straight portions 21 at the forward end and curved out at the rear, (where their rear edges project into suitable slots 22 in the frame, as shown in Fig. 4,) so as to form between them a central exposing-chamber in rear of the lens and two chambers 35 and 36 at the sides for containing the spools of unexposed and exposed film, respectively, and said plates are preferably secured to the sheet-metal shell by suitable lugs or ears 23, arranged upon their upper and lower sides, which project through the top and bottom plates 10 and 11 and may be secured by having the ends of said ears upset or otherwise fastened.

Arranged at the forward portions of the plates 20 is a standard or post 25, preferably of wood, in which is arranged the lens 26, (located at about the center of the front,) and the upper portion of this standard is formed into a chamber 27, upon the rear side of which is placed the finder-mirror 28 and forward of this the finder-lens 29, the ground glass 30 for the finder being inserted in a suitable recess in the top and visible through the aperture 31, formed in the outer cover 6, to which said casing is secured by means of screws 32.

The preferred means for holding the lens-standard in position and also the parts described together is a screw 33, passed through the lower plate 11 and having its head projecting some distance therefrom, so that when the casing containing the operating parts attached to the cover 6 is inserted in the casing 1 a slotted sliding plate 34, arranged in said casing, may be moved to engage the head of said screw and retain the parts in position.

Each of the film-spools, which are alike and interchangeable, preferably consists of a centrally-slotted arbor or spindle 37, having at opposite ends the flanges 38 and 39, the latter being provided with ratchet-teeth, with which coöperate a spring-pawl 40, arranged in the film-receiving chamber 36. Instead of mounting these spools directly in the plates 10 and 11 I provide spool-carriers, consisting of a single plate of metal bent to form two supporting-arms 42, extending parallel with each other, and a connecting portion 41, said carriers being pivoted at 43 in the upper and lower plates 10 and 11 and adapted to be swung out, so as to permit ready access to the spools when the operating parts are removed from the casing 1. One end of the spools is provided with a threaded aperture, and projecting into the recess 36 to coöperate with said aperture is the threaded end of a longitudinally-movable arbor or key 44, having an operating-handle 45 upon its end, arranged outside of the cover 6, said key or arbor being capable of disengagement from the spool by screwing it out, when the spool-carrier may be turned out to one side of the frame.

In order that the spools may be centered and retained in the carriers, I provide around the central apertures in one of the arms a small inwardly-turning flange 46, engaging a suitable concentric groove formed in the ends of the spools, and in the other arm a centering-stud 57, the arms 42 of said carriers being sufficiently elastic to hold the spools in position, but they may be separated for their removal and insertion.

In Fig. 5 I have shown in an enlarged sectional view the means just described for holding the spools in the spool-carriers.

The film adapted for use in this camera is preferably attached to or covered by black paper, which paper has upon its rear side numbers or other indicia denoting the centers of the various exposures of film equal in size to the aperture in the frame 18, so that the operator may view said indicia through the aperture in the back of the casing and ascertain when a new exposure of film has been wound forward in position to be exposed.

In using the camera it will be understood that the frame is removed from the casing, a full spool of film placed between the arms of the carrier in the chamber 35, and an empty spool in the arms of the carrier in chamber 36. Then the end of the paper or film is unwound from the full spool, extended beneath the connecting part 41, over the end frame 18, under the part 41 of the other carrier, and its end is inserted in the slot of the spool in the chamber 36. The carriers are then moved in their chambers, and the key 44 is screwed into the threaded aperture of the spool. Then the frame is placed in the casing and the slide 34 engaged with the catch or screw 33. The film is wound forward by the key, and when the numbers on the back of the film or covering paper are in line with the aperture 4 in the back the exposure is made in any suitable manner. When the film has all been exposed, the frame is removed, the key is unfastened, the full spool removed, (the film being covered by the paper,) the empty spool is transferred to the carrier in chamber 36, and a full spool is inserted in the carrier in chamber 35, as before.

The camera constructed in accordance with my invention is very simple and may be manufactured cheaply, the parts being few, and by stamping or otherwise forming the frame containing the operating parts of sheet-aluminium not only can uniformity be secured, but the cost and weight can be reduced to a minimum.

I claim as my invention—

1. The combination with a camera-frame consisting of top, bottom and front portions, formed of a single piece of metal having the double flanges between the top and bottom portions and the front and the flanges at the rear, of the partition-plates between the top and bottom portions, having the flanges at the rear, a frame having grooves to receive the flanges on the top and bottom and partition-plates, and an inclosing casing for the rear and sides of the frame, substantially as described.

2. In a camera the combination of the frame having the central exposing-chamber narrowed at one end, and film-chambers on opposite sides of the narrowed portion, of the lens-standard mounted in the narrow end of the exposing-chamber and having the finder-chamber and the finder-lens, mirror and ground glass therein, and the main lens also mounted in said standard, substantially as described.

3. In a camera, the combination with the removable frame having the central chamber narrowed at one end, and two film-chambers on opposite sides of said narrowed portion, of the pivoted spool-carriers arranged in the film-chambers, the removable spools detachably connected to said carriers and a casing adapted to contain the frame, substantially as described.

4. In a camera, the combination with the casing, the removable frame having a film-chamber, of a pivoted film-spool carrier adapted to carry a film-spool at one end and pivoted to the frame at the other, and adapted to be swung out of the chamber when the frame is removed from the casing, and a spool removably connected to the free end of the carrier, substantially as described.

5. In a camera, the combination with a supporting-frame, of a spool-carrying frame pivoted thereto and formed with the two arms between the ends of which the spool is supported, and the connecting portion, and a removable spool supported on the ends of the arms, substantially as described.

6. In a camera, the combination with a supporting-frame, of a spool-carrying frame pivoted thereto formed with the two arms, one having a perforation, and the connecting portion, a film-spool detachably connected to and supported by the arms and having a threaded socket, and a removable operating-key projecting through the frame and adapted to engage the socket in the spool when the carrier is in one position, substantially as described.

7. In a camera, the combination with the casing, of a removable supporting-frame having the central chamber narrowed at the front, and the two film-chambers on opposite sides of said narrowed portion, the pivoted film-carrier arranged in one of said film-chambers and adapted to be swung out when the frame is removed from the casing, a film-spool supported in said carrier, and a movable key or arbor adapted to engage the spool when the carrier is swung in the chamber, substantially as described.

8. In a camera having a film-chamber therein, the combination of a pivoted film-carrier adapted to be moved into and out of said chamber provided with the spring-arms, spool-centering devices on the arms, one arm having an aperture, a film-spool having a ratchet-wheel thereon, and a recess in one end, and a longitudinally-movable key accessible from the exterior of the camera, adapted to engage the recess in the spool when the latter is in the chamber, and a pawl engaging the ratchet on the spool, substantially as described.

FRANK A. BROWNELL.

Witnesses:
F. F. CHURCH,
G. A. RODA.